United States Patent [19]

Zeuner et al.

[11] 4,276,810
[45] Jul. 7, 1981

[54] PROGRAMMED VALVE SYSTEM USED FOR POSITIONING CONTROL

[75] Inventors: Kenneth W. Zeuner, Newtown; Alonzo B. Jarman, Wrightstown, both of Pa.

[73] Assignee: Control Concepts, Inc., Newtown, Pa.

[21] Appl. No.: 842,264

[22] Filed: Oct. 14, 1977

Related U.S. Application Data

[63] Continuation-in-part of Ser. No. 578,006, May 16, 1975, Pat. No. 3,980,002, and Ser. No. 723,023, Sep. 13, 1976, Pat. No. 4,202,250, said Ser. No. 578,006, is a continuation of Ser. No. 304,816, Nov. 8, 1972, abandoned, said Ser. No. 723,023, is a continuation-in-part of Ser. No. 578,006.

[51] Int. Cl.³ .................................................. F15B 13/043
[52] U.S. Cl. ........................................... 91/449; 91/459; 91/461; 91/532; 137/596.12
[58] Field of Search ................ 137/596.12, 596.16, 137/118, 101, 596; 91/461, 449, 514, 532, 459

[56] References Cited

U.S. PATENT DOCUMENTS

| | | | |
|---|---|---|---|
| 1,999,834 | 4/1935 | Ernst | 137/101 |
| 2,310,516 | 2/1943 | Clark | 251/30 X |
| 2,508,399 | 5/1950 | Kendrick | 251/50 X |
| 3,045,697 | 7/1962 | Seguenot | 137/596.12 X |
| 3,312,240 | 4/1967 | Ruchser | 137/596.12 |
| 3,508,468 | 4/1970 | Walter | 91/454 |
| 3,737,141 | 6/1973 | Zeuner | 251/129 |
| 3,765,644 | 10/1973 | Zeuner | 251/129 |
| 3,906,838 | 9/1975 | Hofer | 91/459 |
| 3,924,650 | 12/1975 | Parquet | 137/118 X |
| 3,973,580 | 8/1976 | Ueda | 137/118 X |
| 3,980,002 | 9/1976 | Jarman et al. | 91/461 |

FOREIGN PATENT DOCUMENTS

1378345 12/1974 United Kingdom ................ 137/596.12

Primary Examiner—Irwin C. Cohen
Attorney, Agent, or Firm—Allan Ratner

[57] ABSTRACT

A programmed valve system for positioning control having a first two stage valve assembly operable for raising a load and a second two stage valve assembly for lowering the load. Each of the second stages has a poppet with a parabolic contour which is dimensioned with orifice parameters to provide substantially linear flow rate change for minimized shock when one of the second stage poppets closes and the other opens. In the raise assembly, the pilot stage outlet orifice has a cross-sectional area substantially larger than that of the inlet orifice so that the second stage poppet opens much more rapidly than the closing thereof thereby to minimize overshoot when the pilot stage is actuated to the open position.

8 Claims, 6 Drawing Figures

RAISE

LOWER

PROGRAMMED VALVE SYSTEM USED FOR POSITIONING CONTROL

This is a continuation-in-part of (1) application Ser. No. 578,006, filed May 16, 1975, now U.S. Pat. No. 3,980,002 and (2) application Ser. No. 723,023, filed Sept. 13, 1976, now U.S. Pat. No. 4,202,250. Ser. No. 578,006 is a continuation of Ser. No. 304,816, Nov. 8, 1972, abandoned. Ser. No. 723,023 is a continuation-in-part of Ser. No. 578,006.

BACKGROUND OF THE INVENTION

A. Field of the Invention

This invention relates to the field of art of automatic positioning control systems having solenoid operated valve assemblies.

B. Prior Art

Prior positioning control valve systems have produced undesirable fluid shock waves following the opening or closing of the valve. When a valve closes, for example, the total amount of fluid is passed through a valve orifice and the fluid acts on a mass downstream causing an abrupt displacement of the mass. Specifically, the mass may be said to be instantly accelerated by the moving fluid which acceleration results in a shock force. Such shock is applied to the mass from the moving fluid which may produce damage to the mass or components.

This problem positioning control has been particularly important in the contour following mobile equipment field such as for example, in agricultural combines which have very large springy tires. A combine carries a heavy header which may weigh, for example, 2,000 lbs. When the header is hydraulically moved, any shock waves which are produced are transmitted first to the chassis of the combine and then to the tires and results in extremely objectionable oscillations.

A further problem in combine operation has been that after finishing a row, it has been important that the header be rapidly raised and taken out of the row. In the rough terrain of the field, the combine must then be turned, realigned with the row and then the header rapidly lowered back into the field to begin a new cut. As the new cut is being made, the header must be adjusted at high speeds within fractions of an inch in order to maintain proper cutting height. The header must operate within a "dead band" the limits of which are required to be kept at a minimum as for example from one to one and a half inches. Within that narrow dead band, the header must operate and avoid overshoot and undershoot at normal cutting speeds. Thus, a single positioning control hydraulic system must provide rapid raising of a very heavy header load at the end of a row and after the cut has been started, the hydraulic system must then accurately and carefully maintain a very narrow dead band at a desired ideal cutting height with minimized overshoot and undershoot.

Accordingly, an object of the present invention is to provide for a heavy load a narrow dead band with minimal overshoot and undershoot.

Another object of the present invention is to also minimize the shock on the heavy load by means of the parabolic contour of the valve and the sizing of the orifices for providing substantially linear flow rate change when the valve moves.

SUMMARY OF THE INVENTION

A programmed valve system for positioning control having a normally open raise and a normally closed lower two-stage valve assembly. The raise and lower second stage poppets each have an outer substantially parabolic contour to provide a predetermined flow area between the respective orifice and contour whereby the poppets are controlled in closing with substantially linear flow rate change. The inlet section of the raise second stage and the load means are coupled to a fluid source whereby the normally open raise second stage unloads the fluid source during the normal rest state. A differential pressure compensated flow divider which is self piloted is coupled between the fluid source and both the load means and the inlet section of the raise second stage. The flow divider has a pilot chamber with a biasing means with the pilot chamber being in continuous restricted communication with the fluid source. The raise pilot stage has a pilot line directly coupled to the fluid source for full source pressure without coupling through a flow divider and upstream of the flow divider for providing pilot pressure. In this manner upon solenoid actuation of the raise pilot to the valve closed state, pilot pressure from the fluid source is immediately available to the riase pilot stage thereby to actuate the raise second stage and apply fluid to the load with a substantially short dead time.

DETAILED DESCRIPTION

Figure 1:
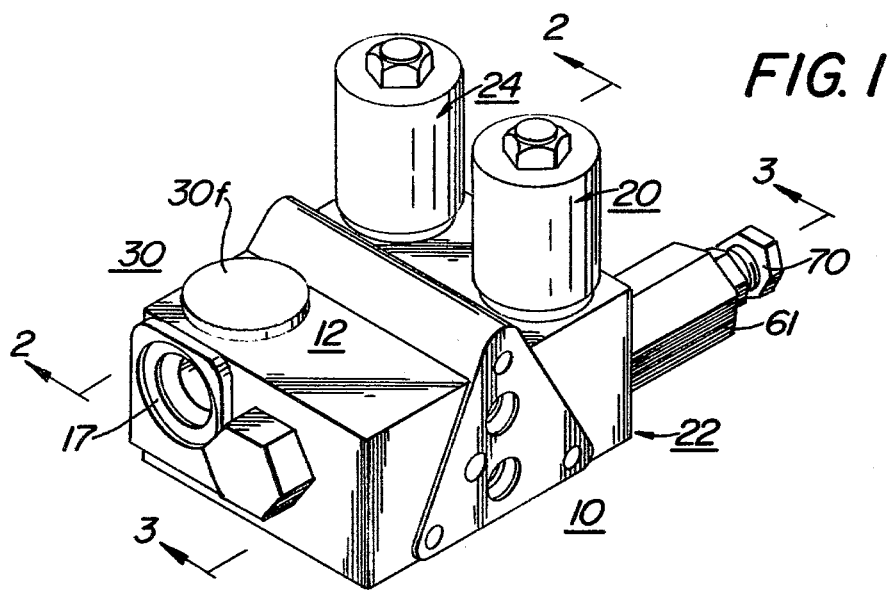
FIG. 1 is a perspective view of a valve system having a pair of two stage valve assemblies of the present invention.

Referring now to FIGS. 1-5, there is shown for mobile equipment an automatic positioning control valve system 10 for hydraulically moving a load or weight 35 through a predetermined distance. Valve system 10 includes within a valve body 12 a two stage raise and unload valve assembly having a first stage solenoid operated poppet valve 24 and a second stage 26 shown in detail in FIG. 2. In addition, valve system 10 includes a two stage valve assembly for lowering the load comprising a first stage solenoid operated pilot valve 20 and a second stage 22. Pilot valve 20 is shown as a normally closed solenoid operated valve and is described in detail, for example, in U.S. Pat. No. 3,737,141. Pilot valve 24 is shown as a normally open solenoid operated valve and is described in detail, for example, in U.S. Pat. No. 3,765,644.

Weight 35 may be a header for a combine where the header is moved by means of a cylinder 31 having a piston 31a. In this manner, cylinder 31 has a gravity load provided by header 35 and the combination may be defined herein as an unbalanced gravity load 31. As well known, a combine has contour following devices which apply energization signals to pilots 20, 24 so that the header is automatically controlled to be in the dead band.

Figure 5:
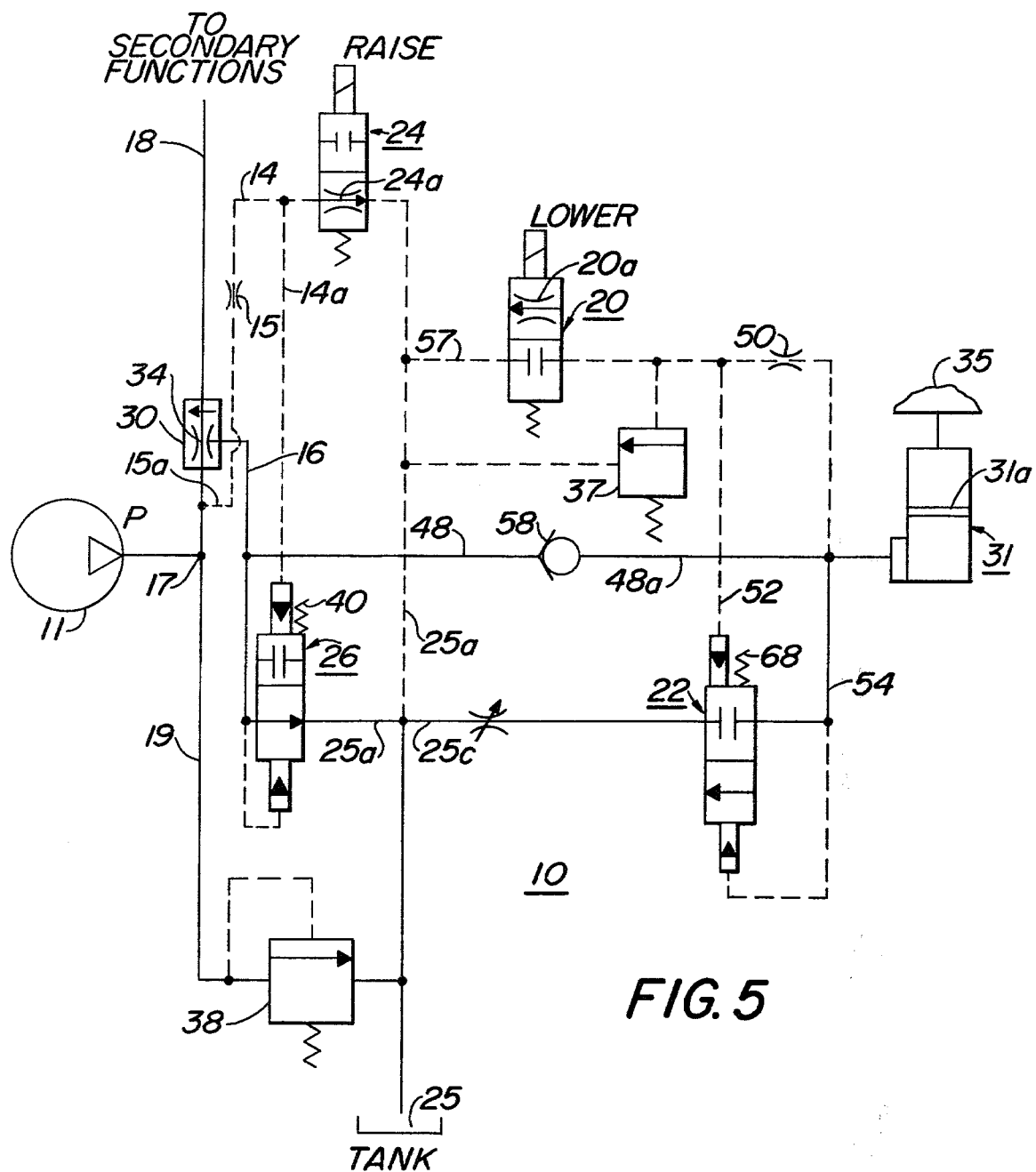
FIG. 5 is a schematic drawing of the valve system of FIG. 1 together with an unbalanced load and a pump.

As best shown in FIG. 5, for the raise circuit, pump 11 is coupled by way of an inlet 17, a flow divider or priority valve 30, a bypass line 16, "under" poppet 26a of second stage valve 26 and then by way of line 25b to tank 25. Inlet 17 is also coupled by way of flow divider 30 to line 18 which supplies desired secondary functions with hydraulic fluid under pressure. Further, inlet 17 is coupled by way of line 19 to a pressure relief valve 38 and then to tank 25. Bypass line 16 is coupled by way of a line 48 through a check valve 59 and line 48a to a cylinder 31. Pilot line 15a for pilot 24 is taken before divider 30 and is coupled through a restricted orifice 15, line 14 and then through pilot orifice 24a (having a substantially large diameter opening for reasons later to be described) and then to tank 25. Pilot line 14 is also coupled by way of line 14a to supply pilot pressure for second stage valve 26.

For the lower circuit, cylinder 31 is coupled (1) by way of a main line 54, "under" poppet 22a through line 25c to tank 25, (2) by way of a pilot line to a load relief valve 37 and (3) through a fixed restricted orifice 50 to pilot valve 20.

In the quiescent or idle state, as shown in FIG. 5, raise pilot 24 and lower pilot 20 are deenergized and are in their illustrated normally open and normally closed states respectively. Accordingly, second stage valves 26 and 22 are respectively open and closed. Flow divider 30 is effective to maintain the pressure across it at a predetermined value such as approximately 50 psi which is applied to pilot line 15a. However, with the large orifice 24a of pilot 24 open, the pressure in line 14 is maintained at a very low value and thus second stage 26 is maintained with poppet 26a full open. Specifically, poppet 26a has a stub or blunt nose end 26f which is "above" (to the right in FIG. 2) second stage orifice 26b by about 1/16 inch, for example, to provide a substantially large opening in the idle state. Since the pump pressure is being applied through flow divider 30, bypass lines 16, second stage 26 and then to tank, there is produced a substantially low back pressure on pump 11 for the unloading of the pump. In this manner, with poppet 26a full open there is provided a lowest possible pump back pressure to avoid overheating the pump.

Even with this low pump back pressure for the idle state, if it is necessary to raise header 35 to avoid an obstacle, for example, immediate response is available. Specifically, when valve 24 is electrically actuated, the approximately 50 psi back pressure on pump 11 is immediately available and provides an instantaneous initial response through lines 15a, 14 and 14a to the pilot of valve 26. Specifically, in operation, upon a raise command, pilot 24 is energized and the pilot is actuated from the open to the closed state. As a result of the availability of the approximately 50 psi at line 15a, poppet nose end 26f begins its short travel toward seat 26b and there is an initial rapid pressure rise. The unloading function continues until nose end 26f travels to a point about even with the "top" (right side in FIG. 2) of seat 26b. At that time, the pressure increases to a static load or pressure balance and check valve 59 opens with fluid under pressure being applied to cylinder 31.

It will be understood that "dead time" is defined as the time from actuation of pilot 24 until the time of pressure balance when fluid is first applied under pressure to cylinder 31. Since movement of header 35 does not occur until the end of this dead time, it is an advantage of system 10 that dead time is substantially short as a result of the availability of 50 psi at line 15a and that valve 26 is in its full open position when blunt nose 26f is very close to about 1/16 inch, for example, the beginning of seat 26b.

Figure 2:
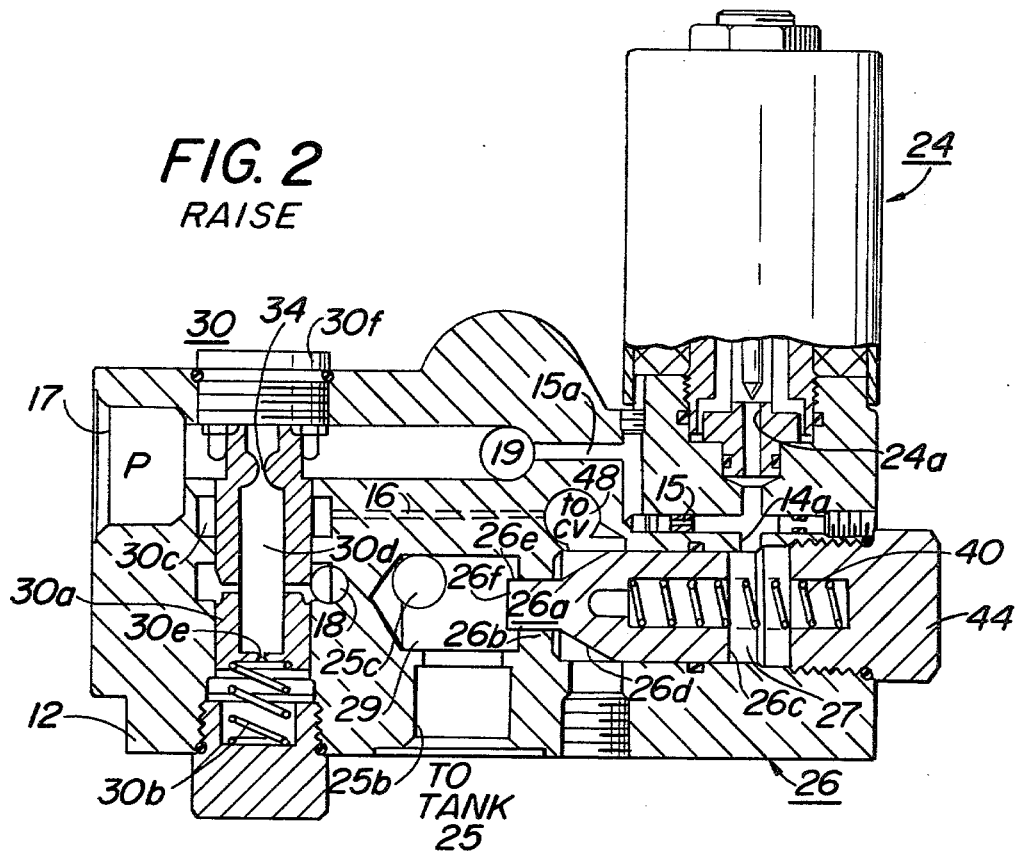
FIG. 2 is a sectional view of the valve system of FIG. 1 taken along lines 2—2.

Pump 11 becomes loaded at the balance pressure $P_B$ and poppet 26a now goes through a major portion of the stroke where the stroke is controlled by the parabolic shape of section 26e of poppet 26a. It will be understood that the closing velocity of poppet 26a is controlled by fixed restriction 15. Pressure is now applied through check valve 59 and line 48a to start the raising of header 35. Poppet 26a continues its closing movement through seat 26b to the left as shown in FIG. 2. During this time, the start raise shock is effectively minimized as a result of the parabolic contour of section 26e which provides a constant acceleration pressure between section 26e and orifice 26b as described herein and also as described in detail in Ser. No. 723,023 and U.S. Pat. No. 3,980,002. When poppet 26a reaches its fully closed position, pump 11 remains loaded and the balance pressure continues to raise header 35.

Thus, with pilot 24 energized and second stage 26 closed, pressure is applied to cylinder 31 by way of check valve 59 thereby to raise header 35. At the time the header arrives at a desired position, the raise function is terminated by deenergizing pilot valve 24 which is returned to its normally open state. Since orifice 24a is of substantially large area, it allows a rapid flow of fluid from line 14a through the poppet and then to tank 25. As a result, poppet 26a opens rapidly and causes the speedy unloading of pump 11 thereby to quickly stop the raising of header 35. In this manner, upon deenergization of pilot 24, header 35 is rapidly stopped in its raise operation thereby minimizing overshoot. As previously described, such overshoot minimization is necessary so that the dead band is desirably maintained as small as possible.

With the fluid flow between parabolic contour 26e and orifice 26b, there is some improvement in the deceleration or stop raise shock. However, it will be understood that this rapid stop in raise does cause some actual stop raise shock. It has been found in this embodiment that such shock has a minimal adverse effect on the system as compared with the more important requirement of minimum overshoot beyond the desired point.

It has also been found that a preferred minimum overshoot has been achieved by an orifice 24a which has at least six times the cross-sectional area of fixed restricted orifice 15. This is to be compared with normal applications where orifice 24a would have a cross sectional area two times that of orifice 15. In an example, orifice 24a may be 0.1 inch.

It will be understood that a secondary function coupled to line 18 may during the foregoing operation require power and thus load pump 11. At that time with a secondary function loading the pump, the pressure at line 15a may increase substantially, as for example to 2,000 psi. It is important that this increased pressure not cause poppet 26a to close. Thus, it is required that orifice 24a maintain the pressure in line 14 at its very low level. This is another reason that orifice 24a is provided with a substantially large cross-sectional area to provide this low pressure to tank 25.

In summary, the advantage of the raise section is an initial rapid increase in pressure to balance pressure $P_B$ during a relatively small value of dead time. As soon as the pressure balance is achieved, the check valve 59 opens and thereafter there is a controlled closing of valve 26 and substantially linear flow rate change for minimized start raise shock. In this manner, there is a controlled transition from the unload phase to the load phase and as soon as pressure balance is achieved, the shock is controlled. The raise is stopped much faster than the start to provide minimized overshoot with some improvement in stop raise shock.

Flow divider valve 30 operates as a pressure compensated flow divider valve in which the pressure across the valve is maintained at a predetermined pressure such as approximately 50 psi. As shown, flow divider 30 is disposed within housing 12 which also forms the housing for valves 20, 22, 24, 26. This is an important advantage and avoids a separate thin line which would be subject to breakage and failure. Specifically, if divider 30 were not within block 12, a line would be required from pump 11 to the divider and from the divider to second stage 26. In addition, a separate thin line, corresponding to line 15a would also be required from pump to pilot 24 and this line would be subject to breakage and failure. As shown in FIG. 2, valve 30 comprises a spool 30a which engages at its lower portion a spring 30b which is received within an end cap. Spool 30a has intermediate openings which communicate with a central chamber 30d and line 18 which is coupled to the secondary functions. Chamber 30d has at its lower end a restricted orifice 30e and at its upper end an orifice 34. An upper end cap 30f engages the upper end of spool 30a. Under normal circumstances with no hydraulic power required in line 18 or any loading by the raise circuit, fluid flow from pump 11 and inlet 17 causes spring 30b to become compressed and fluid flows into groove 30c and then to bypass line 16. With spring 30b properly selected, the pressure at inlet 17 is maintained at approximately 50 psi.

When there is a demand for pressure from line 18, fluid flows from inlet 17 through orifice 34 into central chamber 30d and then through orifice 30e to the lower end of the spool. Thus, spool 30a moves upwardly as a function of the priority system pressure on line 18. By maintaining the drop across orifice 34, there is provided a constant flow to the secondary functions with flow divider 30 effectively operating as two sources of pressure that can be independently pressurized.

Figure 3:
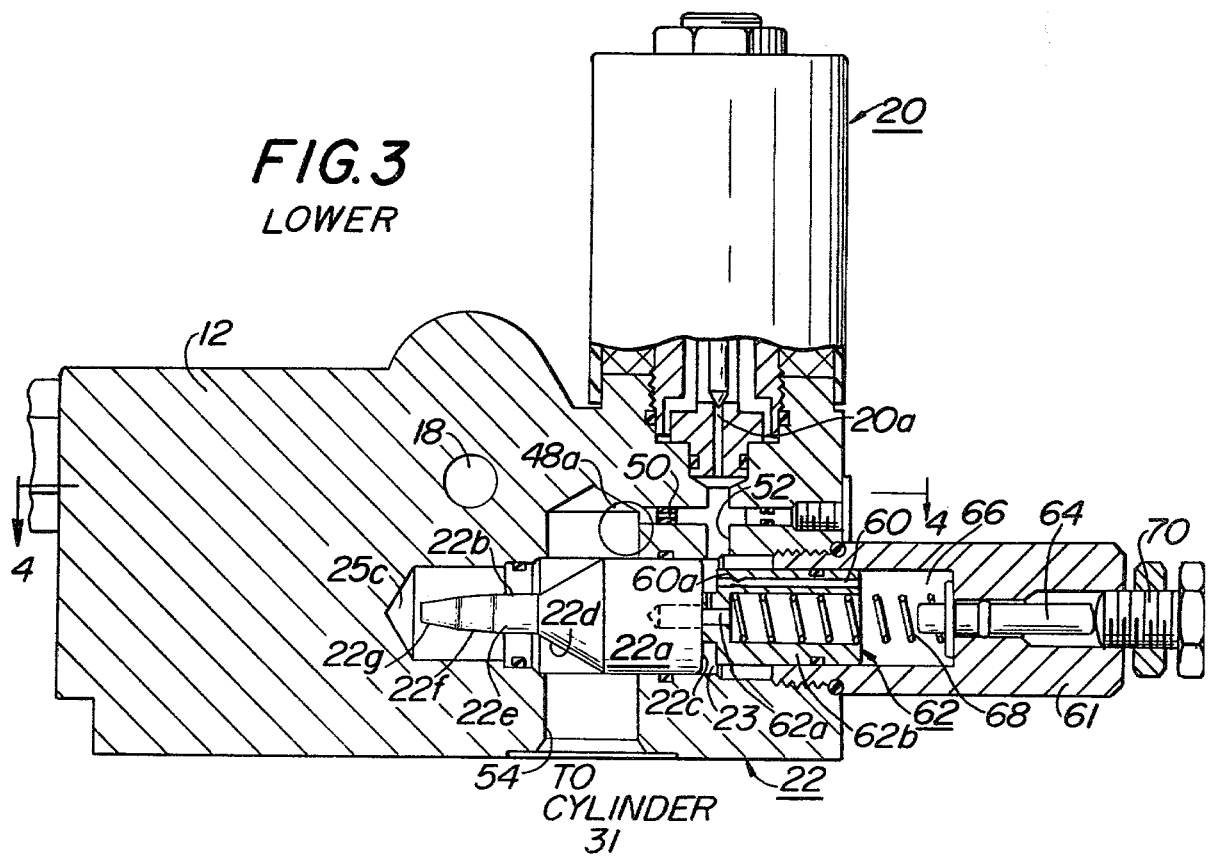
FIG. 3 is a sectional view of the valve system of FIG. 1 taken along lines 3—3.

In the manner previously described, weight 35 is raised during the time of energization of the solenoid of valve 24. Upon deenergization of this solenoid, the idle or quiescent state is resumed and pump 11 is again unloaded. In the idle state, pilot valve 20 is closed and high pressure oil freely passes through fixed, precalculated restriction 50 and line 52 so that full pressure from load 31 is available in chamber 23 to the right of ("above") poppet 22a as shown in FIG. 3. In this manner, second stage lower valve 22 is maintained in the illustrated closed position.

Upon energization of the solenoid of pilot valve 20, there is provided flow through the orifice thereof and by way of pilot line 57 to tank 25. In this manner, there is established a flow across orifice 50. Accordingly, the pressure in chamber 23 is descreased and the system pressure in line 54 is effective to move poppet 22a away from orifice 22b and allow fluid to flow from load 31 through line 54, line 25c and then to tank 25.

The rate of opening of poppet 22a is dampened by a dashpot assembly 62 which operates in the following manner for the following purposes. As previously described, header 35 may be a grain header on a combine with the header operating within a dead band. Within that dead band, valve system 10 is satisfied and there is no electrical actuation of pilot valves 20, 24. With respect to the lowering function, it is desired to provide a high velocity capability when this is required within the dead band. However, it has been found that as the combine travels down the field, there has been substantial undershoot as a result of the weight of the header. Specifically, when the header has been lowered, it would pass below the lower point of the dead band and the automatic controls of the combine (not shown) would immediately initiate a raise condition which would thus cause the header to go into oscillation.

In operation, when poppet 22a moves to the right away from orifice 22b, the right hand face 22c thereof pushes against the left hand face of a dashpot cylinder 62b. Dashpot cylinder 62b is spring biased by a spring 68 secured at its right hand end to an adjustable plunger 64. Assembly 62 has a chamber 66 within which fluid is compressed. Fluid is released from chamber 66 by way of line 60 having a flow restriction 60a into chamber 23. As that fluid is released, poppet 22a is thus restricted in time in the speed in which it opens or moves to the right away from orifice 22b. Accordingly, dashpot assembly 62 is effective to restrict and dampen the opening of poppet 22a thereby to dampen the start lower shock of header 35.

It will be understood that there is no restriction on the closing of poppet 22a since as poppet 22a moves to the left, it is free to separate from dashpot cylinder 62b. When these elements separate, fluid is allowed to freely flow from chamber 23 through unrestricted conduit 62a into chamber 66. In this manner, spring 68 is effective to reset dashpot assembly 62 for the next open command to lower header 35.

Adjustable plunger 64 and spring 68 are received within an adjusting plug 61 threadedly engaged within body 12. As shown, a set screw 70 provides a convenient way to adjust plunger 64 and thereby adjust the maximum travel of poppet 22a. There is thus established the maximum flow from cylinder 30 during the lowering operation through orifice 22b into line 54. In this way, orifice 22b is effectively adjusted and such adjustment may be made as the headers are changed and the operator is thus able to adjust the maximum down velocity of the header to maintain a safe limit.

It will now be understood that the opening of poppet 22a and the resultant lowering of header 35 is dampened by means of the dashpot assembly 62. During this time, the start lower shock is effectively minimized as a result of the parabolic contour of sections 22e–g which provides a substantially linear flow rate change between the sections and orifice 22b as described in detail in Ser. No. 723,023 and U.S. Pat. No. 3,980,002. When poppet 22a reaches its fully open position, header 35 continues to lower until poppet 20 is deenergized. At that time, poppet 20 returns to its normally closed state and poppet 22a unrestricted by damping assembly 62 rapidly closes to minimize undershoot of header 35. In the manner previously described with respect to poppet 26a, the actual stop lower shock has been found in this embodiment to have minimal adverse effect on the system as compared with the important requirement of minimum undershoot beyond the desired point. In any event, with fluid flow between the parabolic contour 22e–g and the orifice, there is some improvement in the deceleration or stop lower shock.

It will further be understood that both poppets 22a and 26a each have substantially parabolic contours 22e–g and 26e, respectively, each having an outer, smooth, imperforate and continuous surface. Further, orifices 15, 24a, 20a and 50 may be considered fixed flow restricting orifices having precalculated and nonvariable dimensions. For poppet 22a which is always disposed within orifice 22b the dimensions of the parabolic contour 22e–g, the second stage orifice 22b and the orifices 20a and 50 are chosen in a predetermined relations for providing the substantially linear flow rate change particularly with respect to opening of the valve as previously described. In this manner, there is provided a constant acceleration in lowering of header 35. With respect to poppet 26a, the dimensions of contour 26e, orifice 26b and orifices 14 and 24a are chosen in a predetermined relation for providing the substantially linear flow rate change from the time of the pressure balance until the poppet 26a closes. In this manner, there is a constant acceleration in raising header 35.

Figure 6:
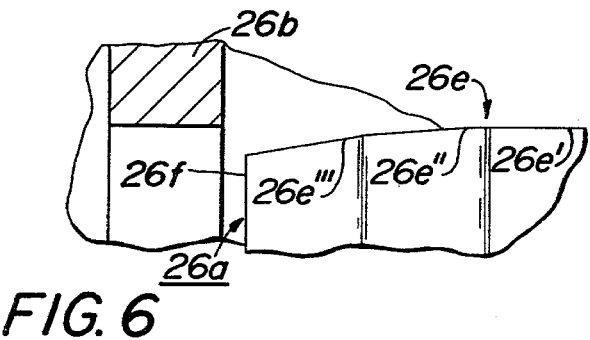
FIG. 6 is a simplified view of the parabolic contour of the second stage poppet and the second stage orifice of the valve assembly of FIG. 2.

For manufacturing purposes, the parabolic contour of poppet 22a may be formed by a three slope approximation of a parabolic curve. The first curve 22b is substantially flat. The next curve 22f is a shallow angle followed by a relatively steep angle 22g. The same three slope approximation is used in manufacture of blunt end poppet 26a which is shown in more detail in FIG. 6. Specifically, first curve 26e' is substantially flat, the next curve 26e'' is a shallow angle followed by a relatively steep angle 26e'''.

Figure 4:
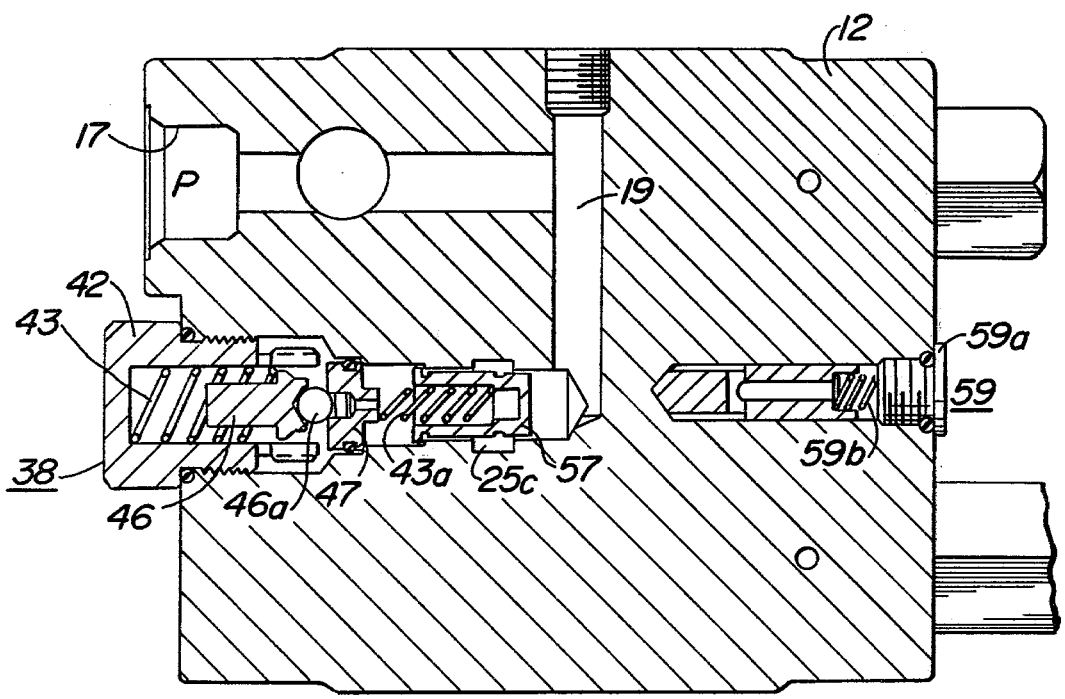
FIG. 4 is a sectional view of the valve system taken along lines 4—4 of FIG. 3.

Pressure relief valve 38 is shown in detail in FIG. 4 and comprises an end cap 42, housing a spring 43 which engages a guide 46. Guide 46 is effective to spring bias a steel ball 46a which engages a plunger 47. The right hand end of plunger 47 contacts one end of the spring 43a, the other end of which is received within a poppet 57 which is effective to close an end of pressure line 19. When the pressure increases beyond a predetermined value, poppet 57 is pushed to the left thereby relieving pressure in line 19 through line 25c, chamber 29 and line 25b to tank 25.

What is claimed is:

1. A programmed valve system in combination with load means and a fluid source having a raise and a lower two-stage valve assembly comprising said raise two-stage valve assembly comprising a raise first solenoid operated pilot stage maintained normally open during the rest state, a raise second stage divided into inlet and outlet sections, a raise second stage orifice between the sections within which a raise second stage poppet reciprocates, said lower two-stage valve assembly comprising a lower first solenoid operated pilot stage maintained normally closed during the rest state, a lower second stage divided into inlet and outlet sections, a lower second stage orifice between the sections within which a lower second stage poppet reciprocates, said raise and lower second stage poppets each having an outer substantially parabolic contour to provide a predetermined flow area between the respective orifice and parabolic contour, said first raise and lower pilot stages being respectively coupled to said raise and lower second stages only by fluid communication for normally maintaining the respective second stages opened and closed and whereby said respective raise and lower second stage poppets are controlled in closing with substantially linear flow rate change with poppet within orifice for minimized shock when the respective pilot stage is actuated to the valve closed position, means coupling said inlet section of said raise second stage and said load means to said fluid source whereby the normally open raise second stage unloads the fluid source during the normal rest state, a differential pressure compensated flow divider which is self piloted and coupled between said fluid source and both said load means and the inlet section of said raise second stage, said flow divider including a pilot chamber with a biasing means therein, said pilot chamber being in continuous restricted communication with said fluid source, said coupling means supplying a divided portion of said fluid source, said raise pilot stage having a pilot line directly coupled to said fluid source for full source pressure without coupling through a flow divider upstream of said flow divider for providing pilot pressure whereby upon solenoid actuation of said raise pilot stage to the valve closed state pilot pressure from said fluid source is immediately available to said raise pilot stage thereby to actuate said raise second stage and apply fluid to said load means with a substantially short dead time from actuation of raise pilot stage to initiation of raising of said load means.

2. The valve system of claim 1 in which said raise pilot stage includes an inlet flow restricting orifice and an outlet orifice with each of said orifices having precalculated dimensions, said outlet orifice having a cross sectional area substantially larger than that of said inlet orifice whereby said raise second stage poppet opens much more rapidly than the closing thereof thereby to minimize overshoot when said raise pilot stage is actuated from the valve closed to the valve open position.

3. The valve system of claim 2 in which said outlet orifice of said pilot stage has a cross-sectional area at least six times greater than that of said inlet flow restricting orifice.

4. The valve system of claim 3 in which said second stage poppet has a blunt nose which in the open position is disposed out of but very close to said second stage orifice for fully unloading the fluid source whereby pressure initially rapidly increases when said pilot stage is actuated to the closed position for a substantially short dead time.

5. The valve system of claim 2 in which the respective dimensions of (1) said parabolic contours of said raise and lower second stage poppets, (2) said second stage orifices and (3) said inlet orifices and said outlet orifices being chosen in a predetermined relation for providing said substantially linear flow rate change from the time of the pressure balance until said respective second stage poppets close thereby to minimize shock.

6. The valve system of claim 5 in which said load means comprises a cylinder having a movable piston coupled to a weight, said cylinder being fluidly coupled to said inlet section of said lower second stage thereby to fluidly control said cylinder.

7. The valve system of claim 1 in which there is provided dashpot means coupled to said lower second stage poppet for only decreasing and dampening the rate of opening of said lower second stage poppet thereby to dampen the lowering of said weight and to permit unrestricted closing of said lower second stage poppet.

8. A programmed valve system in combination with load means and a fluid source having a raise and a lower two-stage valve assembly comprising said raise two-stage valve assembly comprising a raise first solenoid operated pilot stage maintained normally open during the rest state, a raise second stage divided into inlet and outlet sections, a raise second stage orifice between the section within which a raise second stage poppet reciprocates, said lower two-stage valve assembly comprising a lower first solenoid operated pilot stage maintained normally closed during the rest state, a lower second stage divided into inlet and outlet sections, a lower second stage orifice between the sections within which a lower second stage poppet reciprocates, said raise and lower second stage poppets each having an outer substantially parabolic contour to provide a predetermined flow area between the respective orifice and parabolic contour, said first raise and lower pilot stages being respectively coupled to said raise and lower second stages only by fluid communication for normally maintaining the respective second stages opened and closed and wehreby said respective raise and lower second stage poppets are controlled in closing with substantially linear flow rate change with poppet within orifice for minimized shock when the respective pilot stage is actuated to the valve closed position, means coupling said inlet section of said raise second stage and said load means to said fluid source whereby the normally open raise second stage unloads the fluid source during the normal rest state, a flow divider coupled between said fluid source and both said load means and the inlet section of said raise second stage, said coupling means supplying a divided portion of said fluid source, said raise pilot stage having a pilot line coupled to said fluid source upstream of said flow divider for full source pressure for providing pilot pressure whereby upon solenoid actuation of said raise pilot stage to the valve closed state pilot pressure from said fluid source is immediately available to said raise pilot stage thereby to actuate said raise second stage and apply fluid to said load means with a substantially short dead time from actuation of raise pilot stage to initiation of raising of said load means, and dashpot means coupled to said lower second stage poppet for dampening only the rate of opening of said lower second stage poppet thereby to dampen the lowering of said load means.

* * * * *